G. C. Ehrsam,
Felling Trees.

Nº 15,178.　　　　　　　Patented June 24, 1856.

AM. PHOTO-LITHO. CO. N.Y. (OSBORNE'S PROCESS)

UNITED STATES PATENT OFFICE.

GEORGE C. EHRSAM, OF NEW YORK, N. Y.

METHOD OF FELLING TREES BY SAWS.

Specification of Letters Patent No. 15,178, dated June 24, 1856.

*To all whom it may concern:*

Be it known that I, GEORGE C. EHRSAM, of the city, county, and State of New York, have invented a new and useful Improvement for Cutting Down Trees; and I do hereby declare that the following is a full, clear, and exact description of the same, reference being had to the annexed drawings, making a part of this specification, in which—

Figure 1:
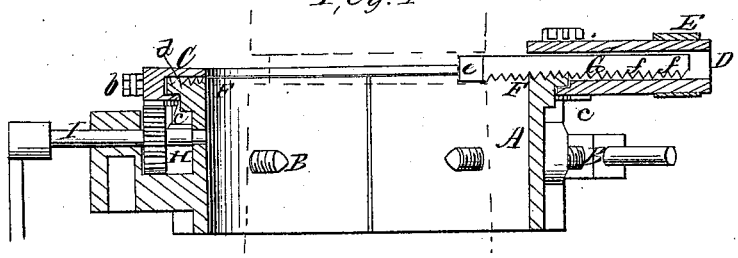
Figure 2:
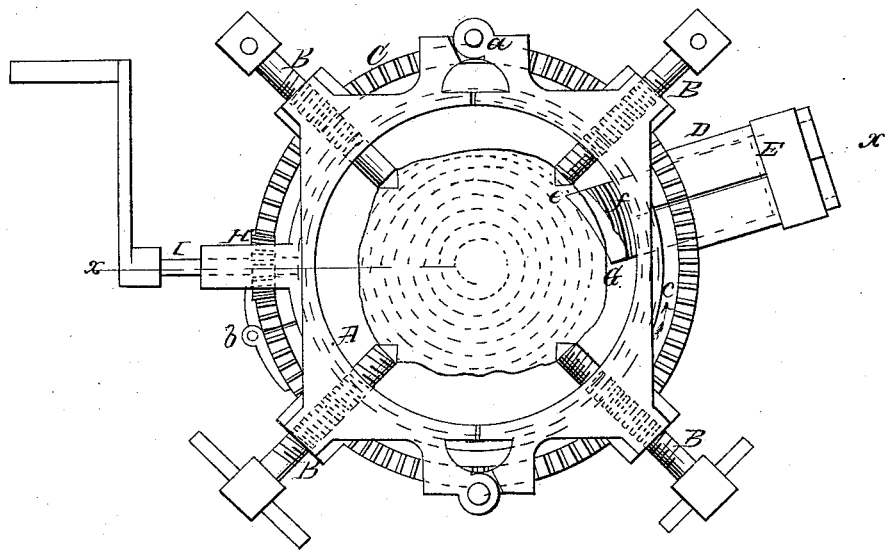

Figure 1 is a transverse vertical section of my improvement applied to a tree, the plane of section being indicated by (x) (x) Fig. 2. Fig. 2, is an inverted plan of ditto.

Similar letters of reference indicate corresponding parts in the two figures.

My invention consists in giving a chisel or cutter a rotating motion around the body or trunk of the tree, and also a feed motion toward the tree by means of an annular rack or toothed rim, and a spiral thread. The rack or toothed rim being attached to a collar which is fitted around the body or trunk of the tree, the screw thread being cut on the upper edge or surface of the collar, and fitting in or between corresponding threads on the underside of the chisel or cutter, as will be presently shown and described.

A, represents a collar or band formed of two parts, connected by a joint (a), so that the collar or band may be opened and closed when desired. The collar may be constructed of cast iron, and it has screws B, four or more, which pass through it radially, said screws working in nuts or screw threads cut in the collar or band.

C, represents an annular rack, or a rim toothed on its lower edge. This rack or rim is also formed of two parts, connected by a joint (b). The rack or rim C, is fitted over the upper edge of the collar or band A, which has a flanch (c) projecting from it, said flanch fitting in a recess (d) in the rack or rim, see Fig. 1. To the rack or rim C, there is attached a socket D, which is of rectangular form, and composed of two parts or halves, a part being attached to each part of the rack or rim, the two parts of the socket, and also the two parts of the rack or rim being kept together by a band E, fitted over the socket D.

The upper edge or surface of the collar or band A, has a spiral thread F, upon it, shown by dotted lines in Fig. 2.

G, represents the chisel or cutter, which is formed of a rectangular piece of metal, having one end somewhat tapered or beveled, so as to form a cutting edge, as shown at (e). The under side of the chisel or cutter has portions of screw-threads (f) formed on it, corresponding to the thread F, on the upper edge of the collar or band A, and the thread F, fits between the threads (f) of the chisel or cutter G.

H, is a pinion which gears into the rack or rim C, said pinion being attached to a crank shaft I, at one side of the collar or band A.

The implement is used as follows. The collar or band A, is opened and placed around the body of the tree to be cut down, shown in red, the two parts of the collar being secured together and the collar attached firmly to the tree by the screws B. The annular rack or toothed rim C, is then fitted to the collar or band A, the chisel or cutter being fitted in the socket D, and the screw threads fitted between the thread on the upper surface of the collar or band A. The rack or rim C, and chisel or cutter G, are then rotated around the trunk of the tree, by turning the crank shaft I, the chisel cutting into the tree circumferentially, and being gradually fed into it by the threads F, (f) on the collar or band, and chisel, till the body of the tree is cut entirely through.

The above implement is simple, may be applied to trees varying considerably in diameter, and will work rapidly, saving much labor and expediting the work attending the felling of trees.

Having thus described my invention, what I claim as new and desire to secure by Letters Patent, is,

The collar or band A, with annular rotating rack or rim C, attached and the chisel or cutter G, fitted within the socket D, which is attached to the rack or rim, the chisel or cutter having portions of screw threads (f) on its under side, which fit between a spiral thread E, on the collar or band A, the whole being arranged substantially as shown, for the purpose set forth.

GEORGE C. EHRSAM.

Witnesses:
WM. TUSCH,
JAMES F. BUCKLEY.